United States Patent [19]

Weitzman et al.

[11] Patent Number: 4,667,291

[45] Date of Patent: May 19, 1987

[54] CONTAINER REDEMPTION METHOD

[75] Inventors: David H. Weitzman, Waterville; Jeffrey M. Young, Sauquoit, both of N.Y.

[73] Assignee: Empire Returns Corporation, Utica, N.Y.

[21] Appl. No.: 753,916

[22] Filed: Jul. 11, 1985

[51] Int. Cl.⁴ .................... G06F 15/21; G06K 15/00
[52] U.S. Cl. .................................. 364/401; 235/383; 235/385; 364/403; 364/406; 209/930
[58] Field of Search ................................ 364/400–401, 364/403–406, 464, 466, 472–473, 478, 200 MS File, 900 MS File, 300 MS File; 29/403.1, 403.3, 403.4; 65/10, 23, 28; 209/522–527, 552, 592, 606, 608, 610, 630, 636, 655–656, 659, 243–245, 370–373, 928, 930; 235/383, 385

[56] References Cited

U.S. PATENT DOCUMENTS

| | | | |
|---|---|---|---|
| 3,605,243 | 9/1971 | Oster | 29/403.3 X |
| 3,613,215 | 10/1971 | Uhl | 29/403.1 X |
| 4,037,302 | 7/1977 | Hollander | 29/403.3 X |
| 4,248,389 | 2/1981 | Thompson et al. | 209/524 X |
| 4,373,435 | 2/1983 | Grevich | 209/930 X |
| 4,406,411 | 9/1983 | Gall et al. | 29/403.3 X |
| 4,440,284 | 4/1984 | De Wooltson | 209/930 X |
| 4,468,847 | 9/1984 | Bowman et al. | 29/403.4 |
| 4,558,212 | 12/1985 | Hampson | 235/383 |
| 4,591,705 | 5/1986 | Toudou | 364/403 X |
| 4,610,359 | 9/1986 | Müller | 364/478 X |

Primary Examiner—Gary V. Harkcom
Attorney, Agent, or Firm—Bruns and Wall

[57] ABSTRACT

A method of redeeming returnable beverage containers that utilizes a return center for the containers located in the retail outlet. The return center includes an elongated counter for sorting and counting the returned containers and a computerized cash register. The clerk at the return center sorts and counts the containers by brand, size, material and amount of deposit and enters this information in the cash register which produces a credit slip for the customer. The return center counter has four openings beneath which are four receptacles for receiving the different scrap grades of containers. The receptacles when full are emptied into compartmentalized, locked hampers, and these hampers when filled are transported to a transfer station where the containers in each hamper compartment are weighed and then processed. The computerized cash register records the number of containers returned for each distributor, the cash register being programmed to coordinate the container brand with the retail outlet's distributor for that brand.

7 Claims, 1 Drawing Figure

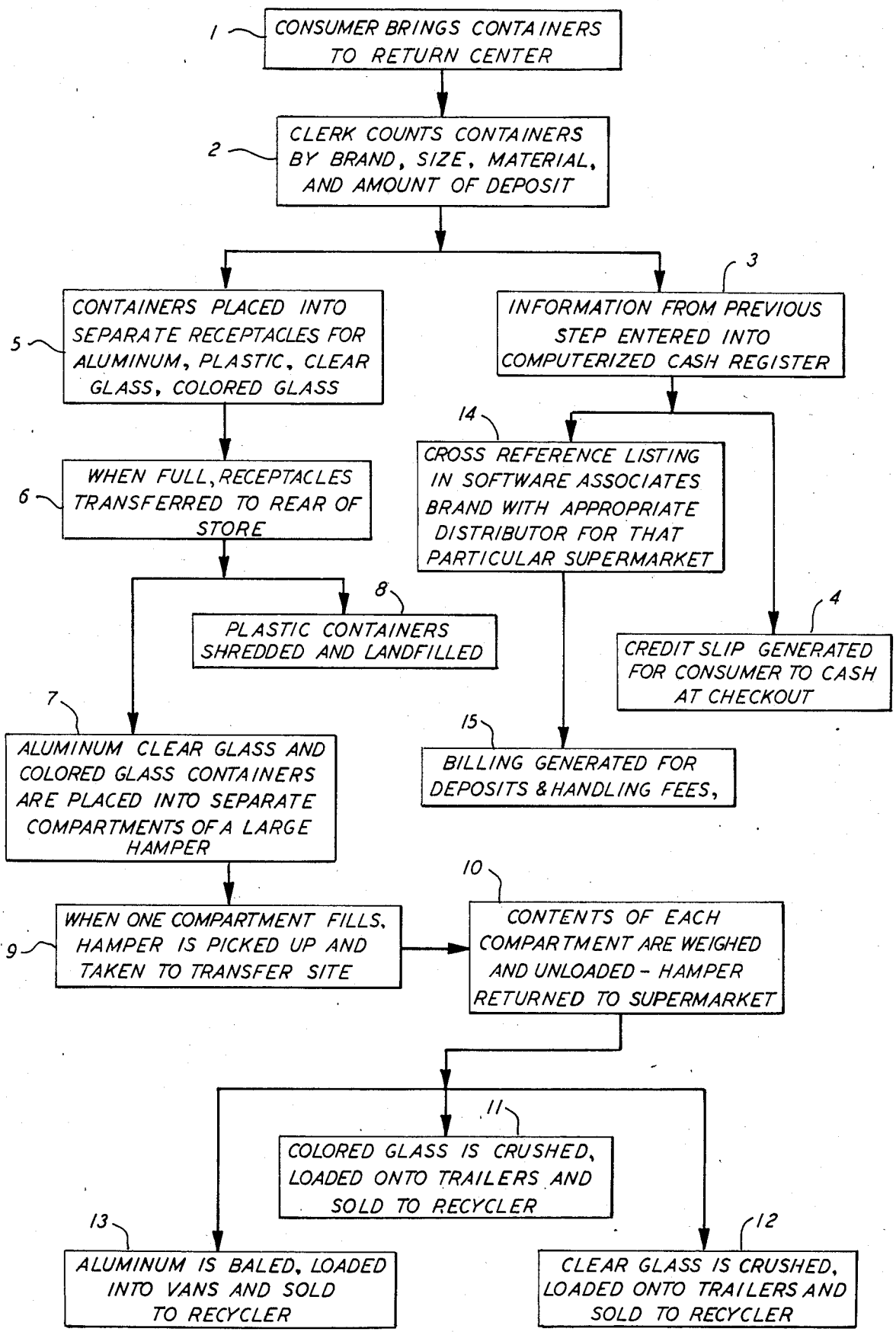

CONTAINER REDEMPTION METHOD

BACKGROUND OF THE INVENTION

This invention relates to a novel and advantageous method, particularly for use by a retail outlet, of redeeming returnable beverage containers.

In several states, laws have been enacted that specify that each container of carbonated beverages, mineral water, beer or other malt beverages sold in the state must carry with it a minimum deposit. This deposit, which in most cases is five cents, is paid initially by the retail outlet or dealer to the distributor who may be the manufacturer of the beverage, a bottler or a wholesaler. The dealer, in turn, must charge this deposit to the purchaser of the beverage.

The purchaser can redeem the deposit at any retail outlet that carries the brand of beverage in question by returning to the outlet his empty container. Under most laws, it is the legal responsibility of the distributor to pick up the empty containers and to pay the retail outlet the amount of the deposits plus a handling fee that may be in the area of 1-½ cents per container. This procedure, while environmentally beneficial, places an undesired burden on retail outlets and distributors.

The applicants are not aware of any prior art that has addressed this container redemption problem for dealers and distributors, and a preliminary search failed to develop any pertinent patents.

SUMMARY OF THE INVENTION

The present invention provides a method of redeeming returnable beverage containers that utilizes a return center for the containers located in the retail outlet. The return center includes an elongated counter for sorting and counting the returned containers and a computerized cash register. The clerk attending the return center sorts and counts the containers by brand, size, material and amount of deposit and enters this information in the case register which, inter alia, produces a credit slip for the customer.

The return center counter has four openings beneath which are four receptacles for receiving the different scrap grades of containers, i.e. clear glass, colored glass, aluminum cans and plastic bottles. The receptacles when full are emptied into compartmentalized, locked hampers outside the building, and these hampers when filled are transported to a transfer station where the containers in each hamper compartment are weighed and then processed.

The computerized cash register, in addition to producing a credit slip for the customer, records the number of containers returned for each distributor, the cash register being programmed to coordinate the container brand with the retail outlet's distributor for that brand. From the information entered into it, the cash register also produces a weekly computer readout that details for the distributor the amount he owes the retail outlet for deposits paid to customers.

An important feature of the procedure outlined above is that of collecting and recording the necessary data at the point of redemption. Another important feature is that of pre-sorting the containers at the point of redemption which is more efficient and economical than sorting them at the transfer station where the containers are processed for salvage.

BRIEF DESCRIPTION OF THE DRAWING

The single drawing is a flow chart setting forth the steps of the container redemption method of the invention.

DESCRIPTION OF THE PREFERRED EMBODIMENT

The method of the present invention is set in motion by the consumer or purchaser of the beverages who brings his empty containers to the retail outlet or dealer in order to redeem the deposit he was required to pay upon purchasing the beverages, see block 1 of the flow chart. The retail outlet is in most instances a super market, liquor store or party center and in accord with the invention will have a beverage container return center to which the purchaser brings his empty containers. The return center is usually located near the check-out counters and occupies only a relatively small space that may range from 48 to 60 square feet.

The return center, as noted above, has an elongated counter or work area where a clerk at the center can sort and count the returned containers, see block 2 of the flow chart. The containers are sorted according to brand, as for example "Coca-Cola", "Pabst" beer, "Perrier" water, etc.; according to size, as for example 12 oz., 16 oz., etc.; according to material, i.e. aluminum, plastic, clear glass or colored glass; and the amount of the deposit. At the preset time, the deposit is usually the same, i.e. five cents, regardless of the brand, container size or material.

The return center also has a computerized or special electronic cash register similar to those used in fast food restaurants. The clerk enters into this register his count of the returned containers according to brand, size and material as noted above, see block 3. From the information entered, the cash register produces a credit slip for the purchaser which can be cashed at a check-out counter, block 4.

The return center counter, in addition to having an area for sorting and counting containers, has four openings therethrough beneath which are four receptacles for receiving the different scrap grades of containers, i.e. clear glass, colored glass, aluminum cans and plastic bottles, block 5. The receptacles are preferably 44 gallon plastic trash barrels, and when they are full they are emptied into a large compartmentalized hamper that is usually located outside the retail outlet at the rear thereof, block 6. In a preferred embodiment of the invention, the hamper is 22' long, 8' wide and 6' high and is divided into three separate compartments for receiving the aluminum, clear glass and colored glass containers, block 7. The plastic containers have no salvage value and they may at this point be shredded and removed for landfill, block 8.

When any one of the hamper compartments becomes filled, the hamper is loaded onto a truck and transported to a transfer station where each compartment is unloaded and its contents weighed after which the hamper is transported back to the retail outlet, blocks 9 and 10. At the transfer station, the clear and colored glass containers are separately crushed and loaded into trailers for sale to a recycler, blocks 11 and 12. At the same time, the aluminum is baled, loaded into vans and sold to a recycler, block 13.

Referring again to the computerized cash register at the return center, block 3, the register is programmed so that as information relating to containers of a particular brand is entered into the register it is automatically allocated to the retail outlet's distributor for that brand, block 14. In this connection, the register maintains a permanent record of the number of containers returned for each individual distributor and at the end of each week the retail outlet has a record and provides the distributor with a computer readout detailing the amount owed by the distributor to the outlet for refunds and handling charges, block 15. The distributor, for his part, is credited with or reimbursed for the value of the salvage.

The purpose of weighing the contents of the hamper compartments when the hamper is taken to the transfer station, block 10, is to provide a check on the security of the procedure. Thus, the actual weight of the salvagable containers can be compared with the theoretical weight generated from cash register tapes to ascertain whether there has been any measurable loss of containers from redemption to salvage.

From the foregoing description it will be apparent that the invention provides a novel and very worthwhile beverage container redemption method that satisfies a definite need. As will be understood by those familiar with the art, the invention may be embodied in other specific forms without departing from the spirit or essential characteristics thereof.

What is claimed is:

1. A method of redeeming and disposing of returnable empty beverage containers returned to a return center, on which containers, when full, a consumer has paid a deposit and the full beverage containers of particular brands having been provided from respective distributors to a retailer, a deposit having been credited to the respective distrubutor from the retailer for each of such full containers provided, said deposit being then credited to said returned center from each said distrubutor for each such empty beverage container of the respective brand, but without requiring physical return of the empty containers to the respective distributors, the method comprising the steps of:
   (a) counting the number of containers delivered by the consumer to the return center by brand, size, and material;
   (b) entering the number of containers of each brand, size, and material as derived from the previous step into a computerized cash register associated with a programmed data processor;
   (c) computing, for each said consumer, credit data with returned container information indicating the refund of deposit due the consumer in accordance with the counts as entered into the cash register;
   (d) providing the consumer with said credit data;
   (e) sorting the returned containers according to material without regard for brand;
   (f) placing the returned containers so sorted into separate receptacles according to the respective material of the so-sorted containers;
   (g) transferring the containers in at least certain ones of the receptacles to an exterior hamper, and thereafter disposing of said transferred containers;
   (h) computing in said data processor the total number of said empty containers of each respective brand returned to said return center by said consumer;
   (i) accumulating the number of returned containers of each brand, and computing in said data processor a credit due to the return center for the total of returned empty containers of the brands distributed by said distributor and returned to said return center; and
   (j) auditing the results of the above steps (h) and (i) by:
      (1.) computing a theoretical weight of the containers in said hamper from the number of containers of each said type of material returned, as based on the information entered on said computerized cash register;
      (2.) weighing said hamper contents when filled with said returned containers to measure the actual weight thereof; and
      (3.) providing said actual and theoretical weights for a comparison therebetween.

2. A method as recited in claim 1, wherein said containers are sorted into scrap grade classes consisting of clear glass containers, colored glass containers, plastic containers, and aluminum cans, and are placed into respective separate ones of said receptacles.

3. A method as recited in claim 2, wherein said plastic containers are shredded upon being transferred from said receptacles.

4. A method as recited in claim 2 wherein said hamper is divided into three separate compartments for receiving the aluminum cans, clear glass containers, and colored glass containers, respectively.

5. A method as recited in claim 1, wherein said computing of the credit data includes printing a credit slip with said returned container information printed thereon.

6. A method as recited in claim 1, wherein said hamper is compartmentalized into several locked compartments, and the step of transferring the containers includes placing the containers of at least certain types into respective ones of said locked compartments.

7. A method as recited in claim 6, wherein said step of weighing the hamper contents includes weighing the contents of each said hamper compartment.

* * * * *

UNITED STATES PATENT AND TRADEMARK OFFICE
CERTIFICATE OF CORRECTION

PATENT NO. : 4,667,291
DATED : May 19, 1987
INVENTOR(S) : David H. Weitzman, Jeffrey M. Young It is certified that error appears in the above-identified patent and that said Letters Patent is hereby corrected as shown below:

Column 3, line 31 - "has" should read "had"

line 35 - "distrubutor" should read "distributor"

line 37 - "returned" should read "return"

Line 37 - "distrubutor" should read "distributor"

Signed and Sealed this

Thirteenth Day of October, 1987

*Attest:*

DONALD J. QUIGG

*Attesting Officer*  *Commissioner of Patents and Trademarks*